United States Patent
Lee et al.

(10) Patent No.: US 10,382,718 B2
(45) Date of Patent: Aug. 13, 2019

(54) FRAME RATE DETECTION METHOD AND FRAME RATE CONVERSION METHOD

(71) Applicant: Anapass Inc., Seoul (KR)

(72) Inventors: Jae Hun Lee, Seoul (KR); Dae Hyun Kim, Seoul (KR); Tae Jin Kim, Seoul (KR)

(73) Assignee: Anapass Inc., Seoul (KR)

( * ) Notice: Subject to any disclaimer, the term of this patent is extended or adjusted under 35 U.S.C. 154(b) by 0 days.

(21) Appl. No.: 16/190,353

(22) Filed: Nov. 14, 2018

(65) Prior Publication Data

US 2019/0199961 A1    Jun. 27, 2019

(30) Foreign Application Priority Data

Dec. 27, 2017  (KR) .................. 10-2017-0180662
Dec. 27, 2017  (KR) .................. 10-2017-0180665

(51) Int. Cl.
*H04N 7/01* (2006.01)

(52) U.S. Cl.
CPC .......... *H04N 7/0127* (2013.01); *H04N 7/014* (2013.01); *H04N 7/0137* (2013.01)

(58) Field of Classification Search
CPC ...... H04N 7/01; H04N 7/0127; H04N 7/0137; H04N 7/014; H04N 7/013; H04N 7/0132; H04N 7/0135
USPC ................ 348/441, 443, 451, 452, 458, 459
See application file for complete search history.

(56) References Cited

U.S. PATENT DOCUMENTS

| | | | |
|---|---|---|---|
| 2004/0081437 A1* | 4/2004 | Asada | H04N 5/77 386/233 |
| 2008/0174694 A1* | 7/2008 | Morad | H04N 7/012 348/448 |

FOREIGN PATENT DOCUMENTS

| | | |
|---|---|---|
| KR | 10-2009-0068502 A | 6/2009 |
| KR | 10-2010-0027408 A | 3/2010 |
| KR | 10-2011-0062914 A | 6/2011 |
| KR | 10-2012-0033296 A | 4/2012 |
| KR | 10-2013-0119328 A | 10/2013 |

OTHER PUBLICATIONS

Korean Office Action for related KR application No. 10-2017-0180662 dated Mar. 7, 2018 from Korean Patent Office.
Korean Office Action for related KR application No. 10-2017-0180665 dated Feb. 5, 2018 from Korean Patent Office.

* cited by examiner

*Primary Examiner* — Sherrie Hsia
(74) *Attorney, Agent, or Firm* — Paratus Law Group, PLLC

(57) ABSTRACT

A method of detecting a frame rate of a source, including: receiving frames of a source provided at an input frame rate; providing the frames to a window having a predetermined length to detect the number of original frames included within the window having the length; and multiplying the input frame rate divided by the length and the number of original frames.

7 Claims, 18 Drawing Sheets

Fig. 6

FRAME RATE DETECTION METHOD AND FRAME RATE CONVERSION METHOD

CROSS-REFERENCE TO RELATED APPLICATIONS

This application claims priority from and the benefit of Korean Patent Applications No. 10-2017-0180662, filed on Dec. 27, 2017 and 10-2017-0180665, filed on Dec. 27, 2017, which are all hereby incorporated by reference in their entirety.

BACKGROUND

1. Field of the Invention

The present invention relates to a frame rate detection method and a frame rate conversion method.

2. Discussion of Related Art

Frame rate conversion (FRC) or motion compensated frame interpolation (MCFI) is an important function of a current display device including a digital TV, and has an objective of removing motion blur and motion judder. The motion blur is caused by a low source frame speed or a property of sampling and holding of a liquid crystal display (LCD) and may be removed by performing MCFI and increasing a refresh frame rate. The motion judder is caused by a process of converting a source frame rate of a movie or the like to a frame rate of a display device and may be removed by detecting the source frame rate, performing MCFI, and the like.

As a content consumption pattern is expanded and changed from TV broadcasting to streaming, the range of image quality and a format of a source is greatly diversified. In a view point of the frame rate conversion (FRC), there are contents with various frame rates of 50 Hz, 30 Hz, 24 Hz, 12 Hz, 8 Hz, and the like as well as 60 Hz. In order to output the contents with a predetermined frame rate, for example, 60 Hz, source contents have to be converted at the predetermined frame rate.

As an example, a pattern, in which an initial frame is repeatedly inserted between two adjacent frames of the source two times and a second frame is repeatedly inserted therebetween, is repeatedly performed such that the source with a frame rate of 24 Hz is converted at a frame rate of 60 Hz. However, since frames which are initially disposed with equidistant intervals in a source are not repeatedly disposed with equidistant intervals during the conversion process, judder in which movement is not smooth occurs when the converted frames are displayed without change.

The display device detects the frame rate of the source and removes repeatedly inserted frames to remove the judder. Then, the display device performs motion estimation (ME) and motion compensation (MC) using frames, which are not repeated, to perform MCFI.

SUMMARY

In the related art, a frame rate of a source is identified by detecting a repeating pattern among input frames, and searching for a best matching pattern among predefined patterns. As an example, when a pattern, in which any one frame is repeated three times and the next frame is repeated two times, is repeated, a frame rate of a source is identified as 24 Hz. In a case in which repeating patterns did not match the predefined patterns, a source frame rate is designated as 60 Hz. After the frame rate of the source is identified, hardware is controlled to correspond to the identified source frame rate to perform motion compensated frame interpolation (MCFI) among a plurality of frame rate conversion scenarios.

According to a related source frame rate detection method, when a frame rate in one source is mutually converted to various frame rates, an output frame rate is abruptly changed. In addition, when there is digital noise or poor editing in an input frame, an abrupt change may occur even without a change in frame rate. In this case, since there are no matching patterns, a frame rate is changed to 60 Hz which is a default value as a search result, judder may remain on a screen due to incorrect or rough motion estimation (ME), motion compensation (MC), and MCFI, or may rather become worse.

In addition, a frame rate conversion method according to the related art is performed by selecting a scenario, which corresponds to a detected frame rate, among ME, MC, and MCFI scenarios predetermined according to a source frame rate. Accordingly, in the related art, since all scenarios corresponding to frame rates of existing source contents have to be prepared, and the frame rates have to be converted, load is generated in terms of hardware and software.

The present invention is mainly directed to reducing disadvantages of the frame rate detection method and the frame rate conversion method according to the related art.

A first aspect of the present invention provides a method of detecting a frame rate of a source including the steps of (a) counting the number of original frames in a window having a predetermined length, wherein frames of the source are repeated and are input with an input frame rate and (b) calculating the input frame rate using a ratio between the predetermined length and the number.

A second aspect of the present invention provides a method of detecting a frame rate of a source including the steps of (a) receiving frames of a source provided at an input frame rate (T), (b) providing the frames to a window having a predetermined length (k) to detect the number of original frames n included within the length (k), and (c) multiplying the input frame rate divided by the length (T/k) and the number of original frames (n).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a view illustrating an outline of an operation of the present embodiment in a case in which frames with a source frame rate of 24 Hz are provided at an input frame rate of 60 Hz;

DETAILED DESCRIPTION

Figure 1:
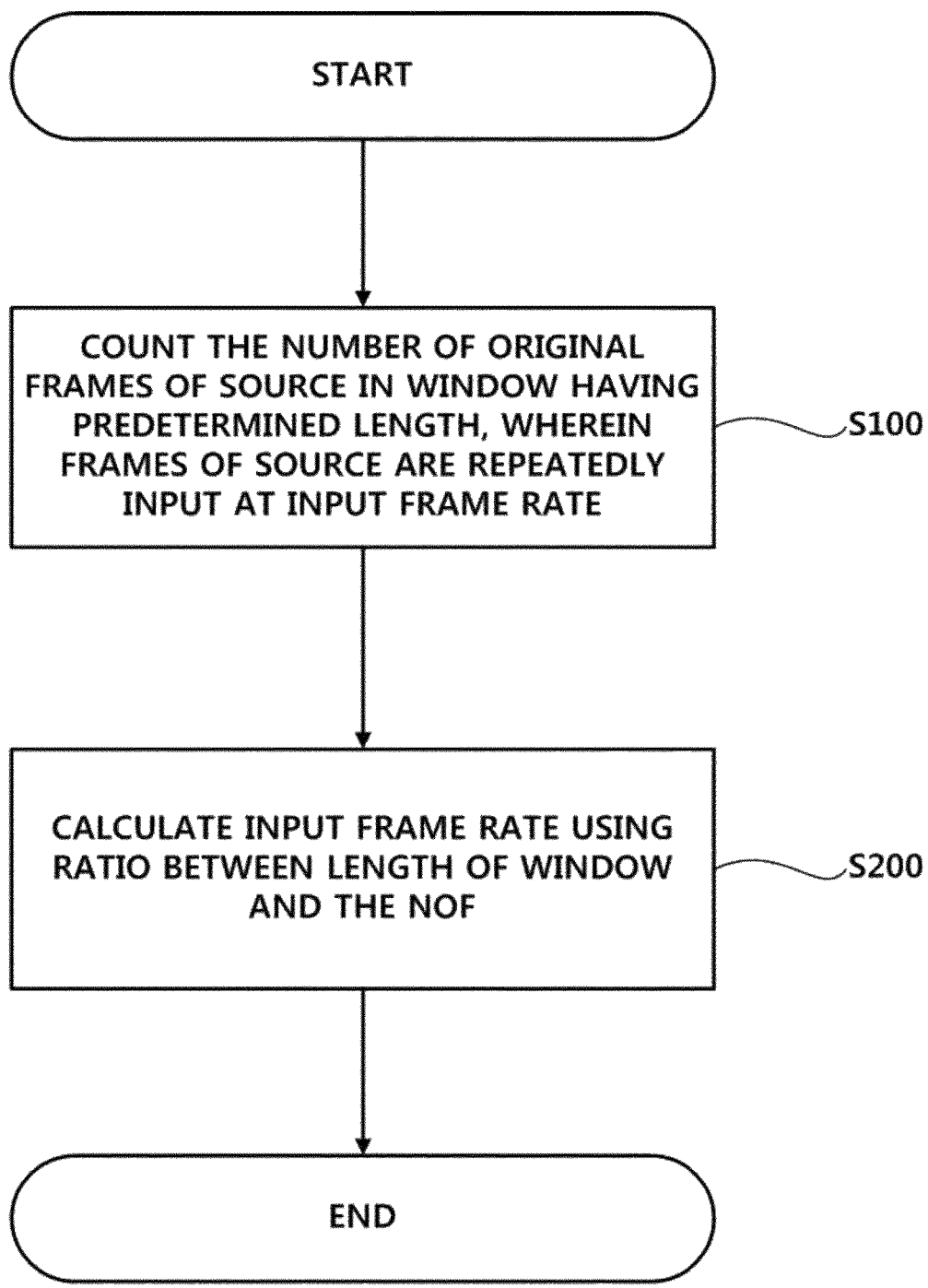
FIG. 1 is a flowchart illustrating an outline of a method of detecting a frame rate of a source according to the present embodiment.

However, these are provided as exemplary examples of the present invention, and do not limit the scope of the present invention in any respect. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Meanwhile, terms described in the specification should be understood as follows.

The terminology used herein is for the purpose of describing particular embodiments only and is not intended to be limiting to the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Operations may be performed through an order different from the described order unless the context clearly indicates a specific order. That is, the operations may be performed in the described order, substantially at the same time, or in an order opposite to the described order.

Sizes, heights, thicknesses, and the like of components illustrated in the accompanying drawings referred to in described embodiments of the present invention are intentionally exaggerated for the sake of convenience in the description and ease of understanding, and are not proportionally enlarged or reduced. In addition, certain components illustrated in the drawings may be intentionally illustrated in an enlarged manner and the other components may be intentionally illustrated in a reduced manner.

Unless otherwise defined, all the terms used herein have the same meaning as commonly understood by those skilled in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined here.

A frame in the description of the present embodiment denotes an image frame or progressive image frame which is de-interlaced from an interlaced image. In addition, in the accompanying drawings, a character, such as A, B, or the like, added to a frame is a descriptor of the frame and is used for describing a repeating pattern of the frame.

Frame Rate Detection Method

Hereinafter, a method of detecting a frame rate of a source according to the present embodiment will be described with reference to the accompanying drawings. FIG. 1 is a flowchart illustrating an outline of the method of detecting a frame rate of a source according to the present embodiment. Referring to FIG. 1, the frame rate detection method according to the present embodiment detects a frame rate of a source by (a) counting the number of original frames (NOF) in a window having a predetermined length when frames of a source are repeatedly input at an input frame rate (S100), and (b) calculating a input frame rate using a ratio between a length k of the window and the NOF (S200).

Figure 2:
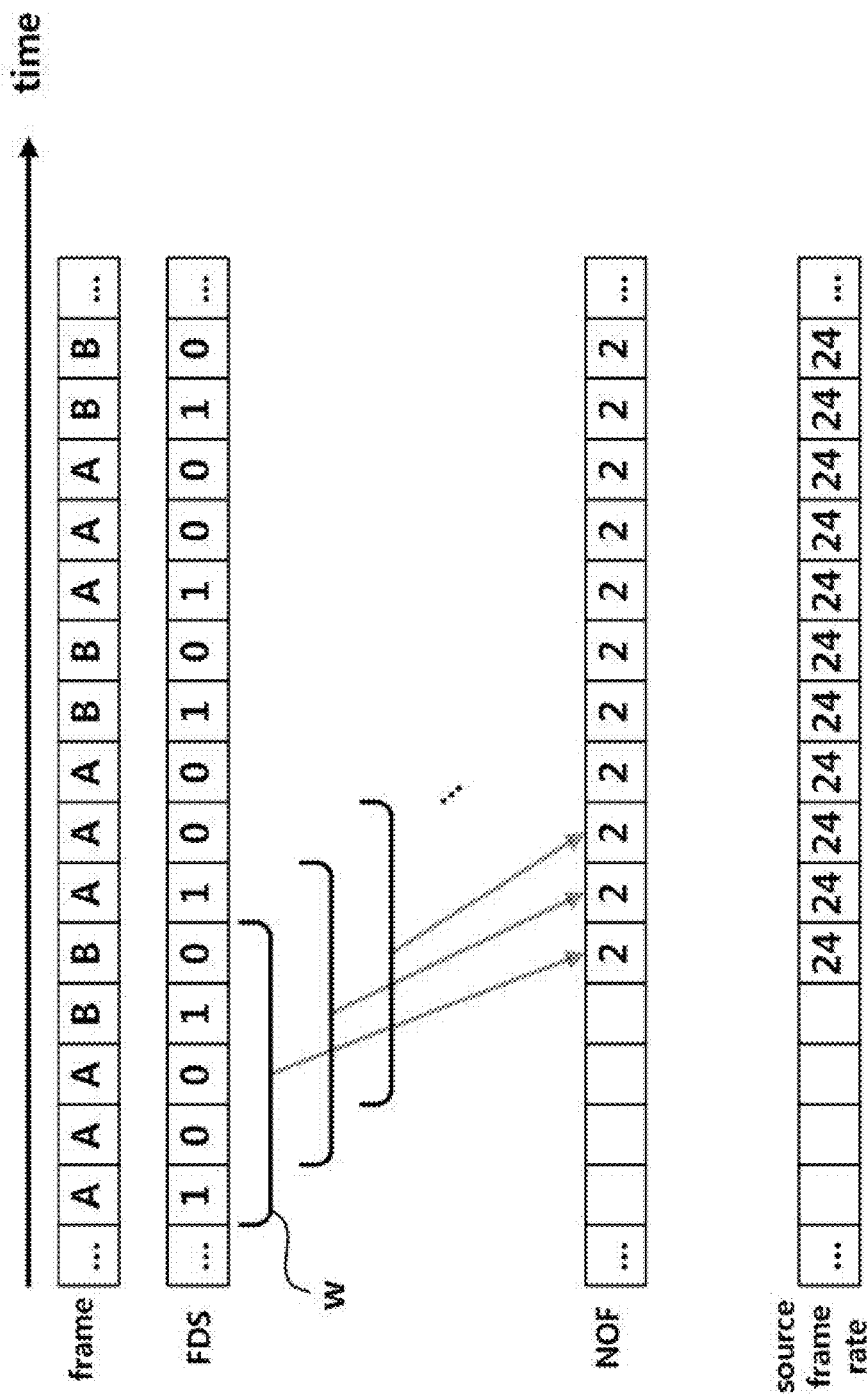
FIG. 2 is a view for describing an operation of the present embodiment in a case in which a source with a frame rate of 24 Hz is received at an input frame rate of 60 Hz.

FIG. 2 is a view for describing an operation of the present embodiment in a case in which a source with a frame rate of 24 Hz is received at an input frame rate of 60 Hz. Referring to FIG. 2, a frame difference sequence (FDS) is formed with respect to sequentially input frames. In one embodiment, when a subsequent input frame is different from an immediately preceding frame, 1 is assigned thereto, and when the subsequent input frame is the same as an immediately preceding frame, 0 is assigned thereto to form a FDS.

A frame A may be expressed as 1 because of being different from an immediately preceding frame, and the next two frames may be expressed as 0 because of being the same as frame A. The next frame B may be expressed as 1 because of being different from an immediately preceding frame. The next frame may be expressed as 0 because of being the same as the immediately preceding frame. In one embodiment, frames expressed as 1 in the FDS may be stored in a buffer.

The NOF in a window w having a predetermined length k is checked (S100). Since 1 is assigned to a current frame that is different from an immediately preceding frame and 0 is assigned to a current frame that is the same as an immediately preceding frame in the FDS, the NOF included in the window w may be determined by counting the number of frames assigned as 1 in the window w. As illustrated in FIG. 2, the NOF included in a window is determined while a window w shifts.

In one embodiment, a unit in which original frames are repeated may be determined from the FDS. According to the embodiment illustrated in FIG. 2, it can be shown that [10010] is repeated periodically, this means that two original frames are repeated such that one is repeated three times and the other is repeated two times, and a repeating unit of the five frames is periodically repeated.

A frame rate is calculated from the detected NOF and a length of a window. In the embodiment illustrated in FIG. 2, a window length k is five frames, and a window w includes two original frames. In this case, a source frame rate F may be obtained by calculating an input frame rate using a ratio between the window length k and the NOF using the following Equation 1.

$$k:n=T:F \qquad \text{[Equation 1]}$$

(k: a window length, n: an NOF, T: an input frame rate, F: a frame rate of a source)

Equation 2, in which Equation 1 is rearranged with respect to the frame rate F of a source, is as follows.

$$F = n\frac{T}{k} \qquad \text{[Equation 2]}$$

(k: a window length, n: an NOF, T: an input frame rate, F: a frame rate of a source)

That is, the frame rate F of a source may obtained by calculating the input frame rate using a ratio between the window length and the NOF in a window using Equation 1, or by dividing the input frame rate T by the window length and multiplying the division result by the NOF as in Equation 2.

When calculating, the frame rate F of the source is 24 Hz, and the frame rate of the source is calculated to converge to the same value while the window w shifts. The calculated frame rate of the source is the same as a provided frame rate of the source.

Figure 3:
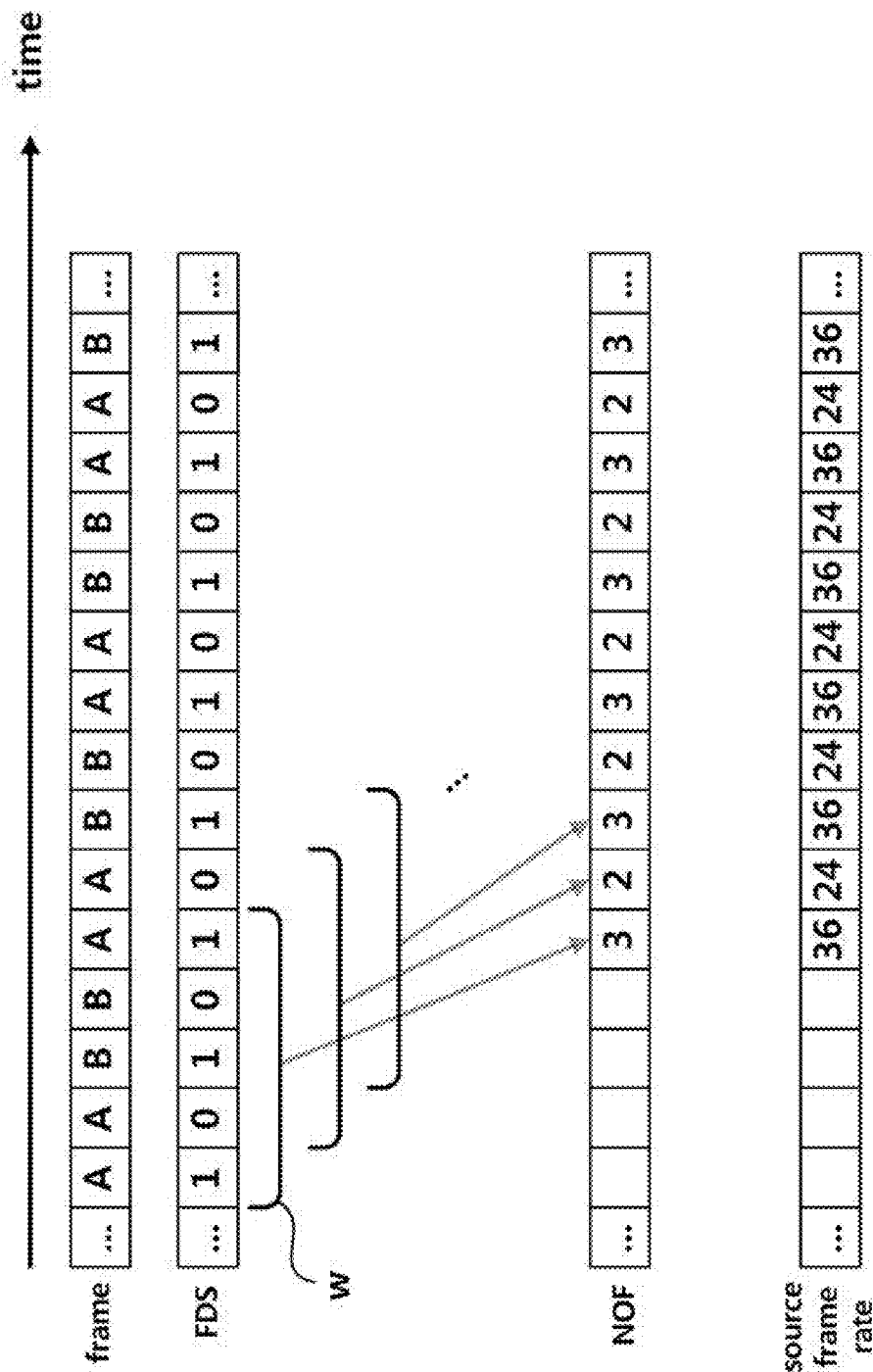
FIG. 3 is a view illustrating a process of obtaining a frame rate of a source using a window having a five frame length in a case in which a source with a frame rate of 30 Hz is provided at an input frame rate of 60 Hz.

FIG. 3 is a view illustrating a process of obtaining a frame rate of a source using a window having a length of five frames in a case in which the source with a frame rate of 30 Hz is provided at an input frame rate of 60 Hz. Referring to FIG. 3, an FDS is formed with respect to sequentially provided frames. In the illustrated embodiment, [10] repeats in the FDS, and a repeating unit includes two frames. When a repeating unit is short, the repeating unit may be incorrectly determined. Accordingly, a repeating unit may be determined as four frames in this case in order to prevent errors of the repeating unit.

An NOF n in a window w is obtained using a window having a length of five frames. In the embodiment illustrated in FIG. 3, as a window w shifts, the NOF n in the window w oscillates between 3 and 2.

When the NOF is 3, a frame rate of a source is calculated as F=3*(60/5)=36 using Equation 2. In addition, when the window shifts so that the NOF is 2, a frame rate of the source is calculated as F=2*(60/5)=24. The calculated frame rate of the source oscillates between 36 and 24 while the window w shifts. However, the frame rate is calculated as 30 Hz when an average of the oscillating values is chosen as the frame rate, and is the same as a frame rate of the provided source.

In one embodiment, the calculation of an average may be performed using the number of frames corresponding to an integer multiple of a repeating unit of frames. As another embodiment, the calculation of an average may be performed using the predetermined number of sequentially provided frames. The accuracy of a calculated frame rate increases when the number of frames for calculating an arithmetic average is an integer multiple of a repeating unit, or the number of frames increases. In addition, as the number of frames increases, a property of robustness against noise is obtained.

Figure 4:
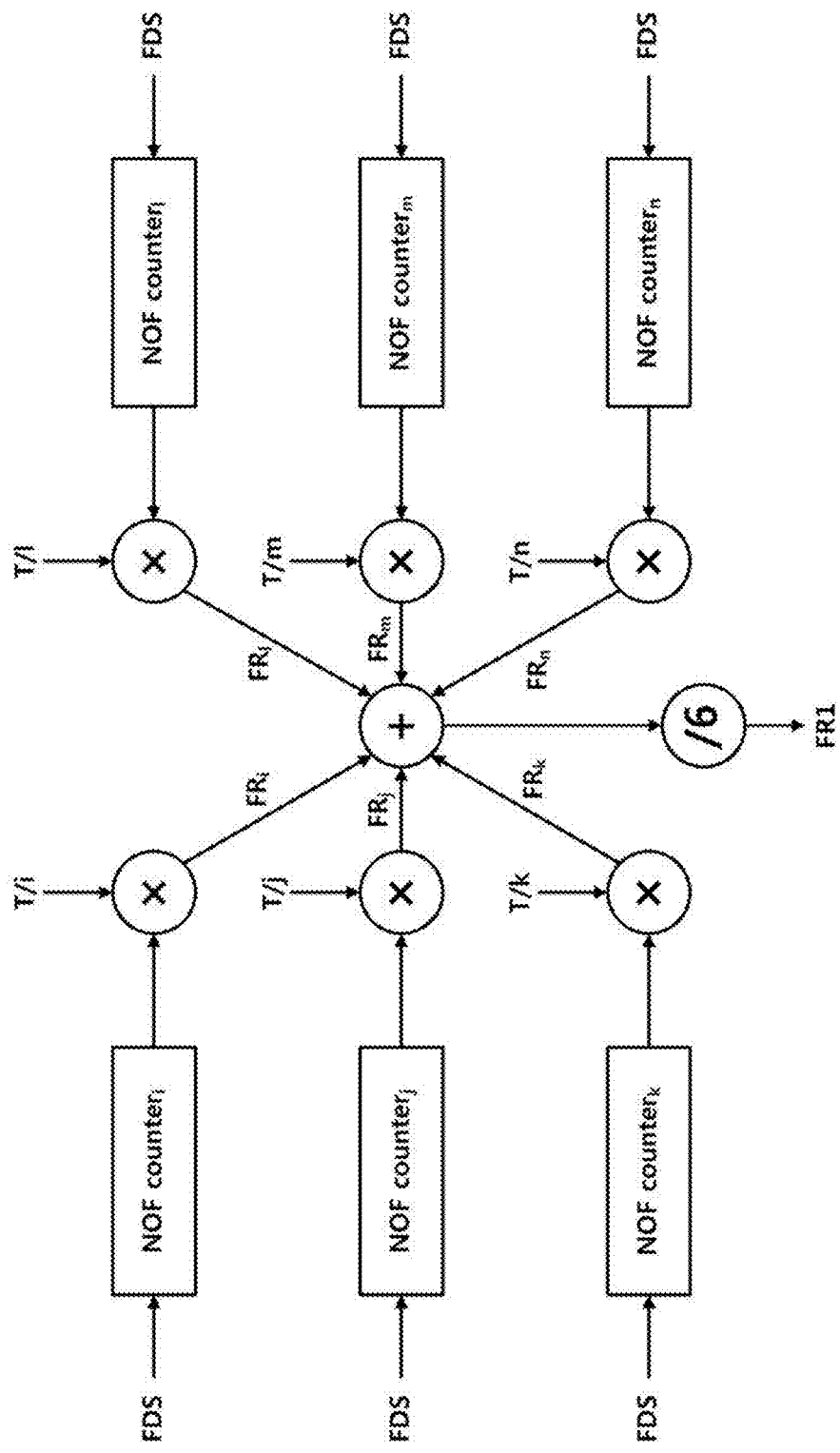
FIGS. 4 and 5 are block diagrams illustrating outlines of frame rate calculation methods which are robust against noise.
Figure 5:
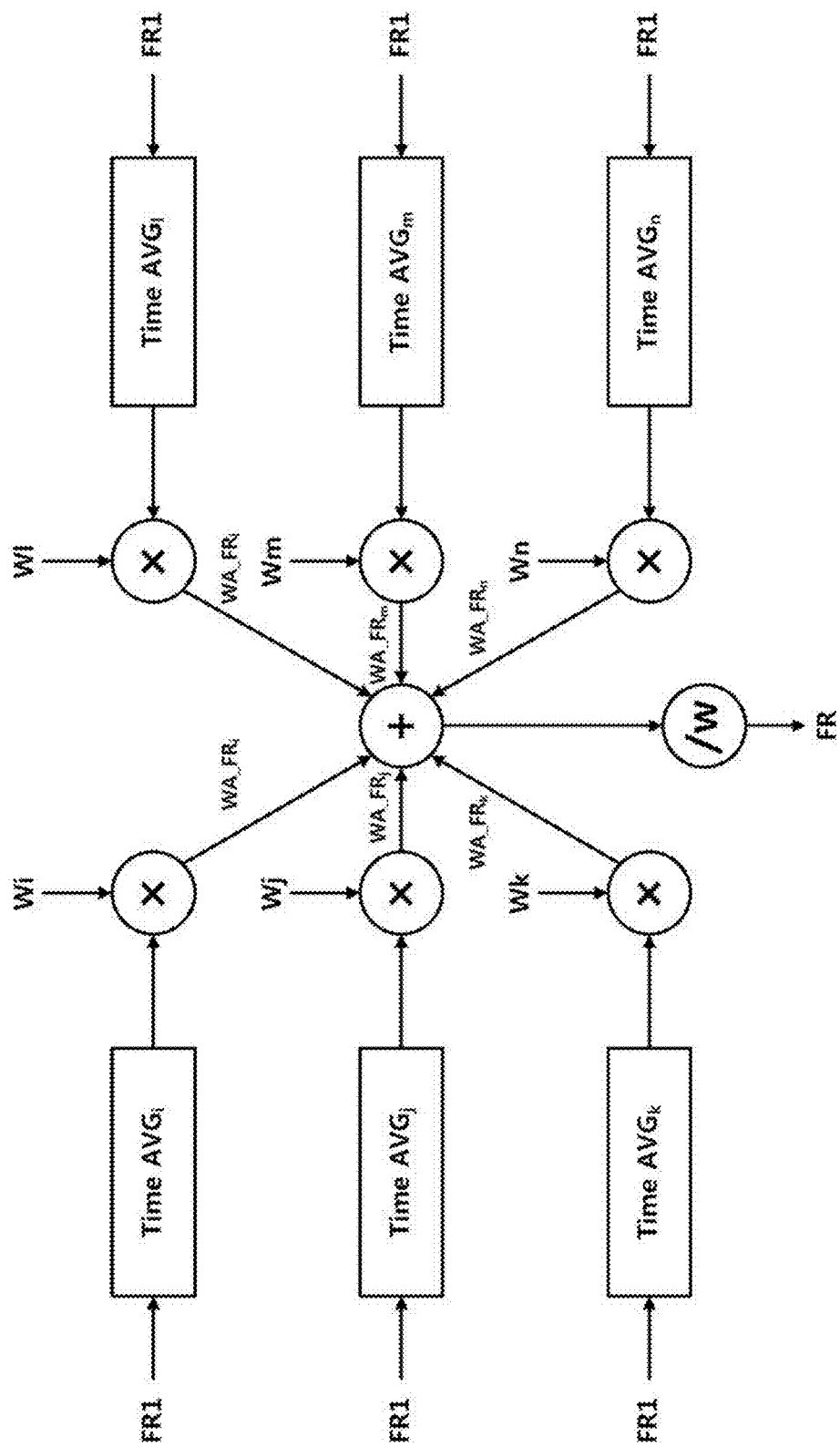

FIGS. 4 and 5 are block diagrams illustrating outlines of frame rate calculation methods which are robust against noise. Referring to FIG. 4, the NOF of $counter_i$, the NOF of $counter_j$, the NOF of $counter_k$, the NOF of $counter_l$, the NOF of $counter_m$, and the NOF of $counter_n$ in windows are obtained from FDS using the windows having window lengths i, j, k, l, m, and n.

In one embodiment, a window length may be determined to correspond to a frame conversion scheme which is currently used. Table 1 shows a part of the currently used frame repeating schemes. Referring to the following Table 1, currently used frame conversion schemes insert sources with frame rates of 8 Hz, 12 Hz, 24 Hz, 25 Hz, 30 Hz, 50 Hz, and the like according to corresponding repeating patterns to convert to an input frame rate (60 Hz). Repeating units of the frames according to repeating schemes are 4, 5, 6, 10, 12, and 15 frames. In one embodiment, window lengths i, j, k, l, m, and n for calculating the frame rates may be determined to correspond to the repeating units.

TABLE 1

| source frame rate | repeating pattern | repeating unit (frames) |
|---|---|---|
| 8 Hz | AAAAAAAABBBBBBB | 15 |
| 12 Hz | AAAAAABBBB | 10 |
| 12 Hz | AAAAABBBBB | 10 |
| 24 Hz | AABBCCDDDD | 10 |
| 24 Hz | AABBBCCCDD | 10 |
| 24 Hz | AAABB | 5 |
| 25 Hz | AAABBCCCDDEE | 12 |
| 30 Hz | AABB | 4 |
| 50 Hz | ABCDEE | 6 |

The NOFs in windows are multiplied by values corresponding to window lengths. When a window length is i, and an input frame rate is T Hz, NOFs are multiplied by T/i as in Equation 2. As an example, when a window length is 4 and an input frame rate is 60 Hz, 15 (=60/4) is multiplied by the NOF in a window to calculate a frame rate (see Equation 2). Calculated frame rates $FR_i$, $FR_j$, $FR_k$, $FR_l$, $FR_m$, and $FR_n$ in windows having different lengths are added to calculate an arithmetic average. When a frame rate FR1 is calculated using a plurality of windows having different lengths according to the illustrated embodiment, noise sensitivity in frame rate calculation may be reduced because the influence of miscalculation due to noise may be reduced.

Referring to FIG. 5, time average calculations $AVG_i$, $AVG_j$, $AVG_k$, $AVG_l$, $AVG_m$, and $AVG_n$ are performed for the frame rate FR1 calculated at the previous stage using the plurality of lengths i, j, k, l, m, and n. A length denotes the number of the frame rates FR1 used for time average calculation, and when a length is 6, a time average calculation is performed for six frame rates FR1 which have been sequentially provided recently.

As an example, a length of a time average calculation may be the same as a length of a window used for counting the NOF. As another example, a length of a time average calculation may correspond to an integer multiple of a length of a window used for counting the NOF.

The time average calculation is performed for the frame rate FR1 which is provided at the previous stage, the calculation result thereof is multiplied by weights, $w_i$, $w_j$, $w_k$, $w_l$, $w_m$, and $w_n$, and the calculation results are added to calculate a weighted average. In one embodiment, a weight may be an integer, and when a time average of the frame rates FR1 converges, the weight may increase by 1 until the weight reaches a length of a time average calculation. In addition, when a time average of the frame rates FR1 does not converge, a weight may decrease by 1 until the weight reaches 0. In one embodiment, when a length of the time average calculation is 5, a weight may be in the range of 0 to 5. A weight may increase when a calculated time average converges to a predetermined value and may decrease when the calculated time average oscillates or diverges.

Figure 6:
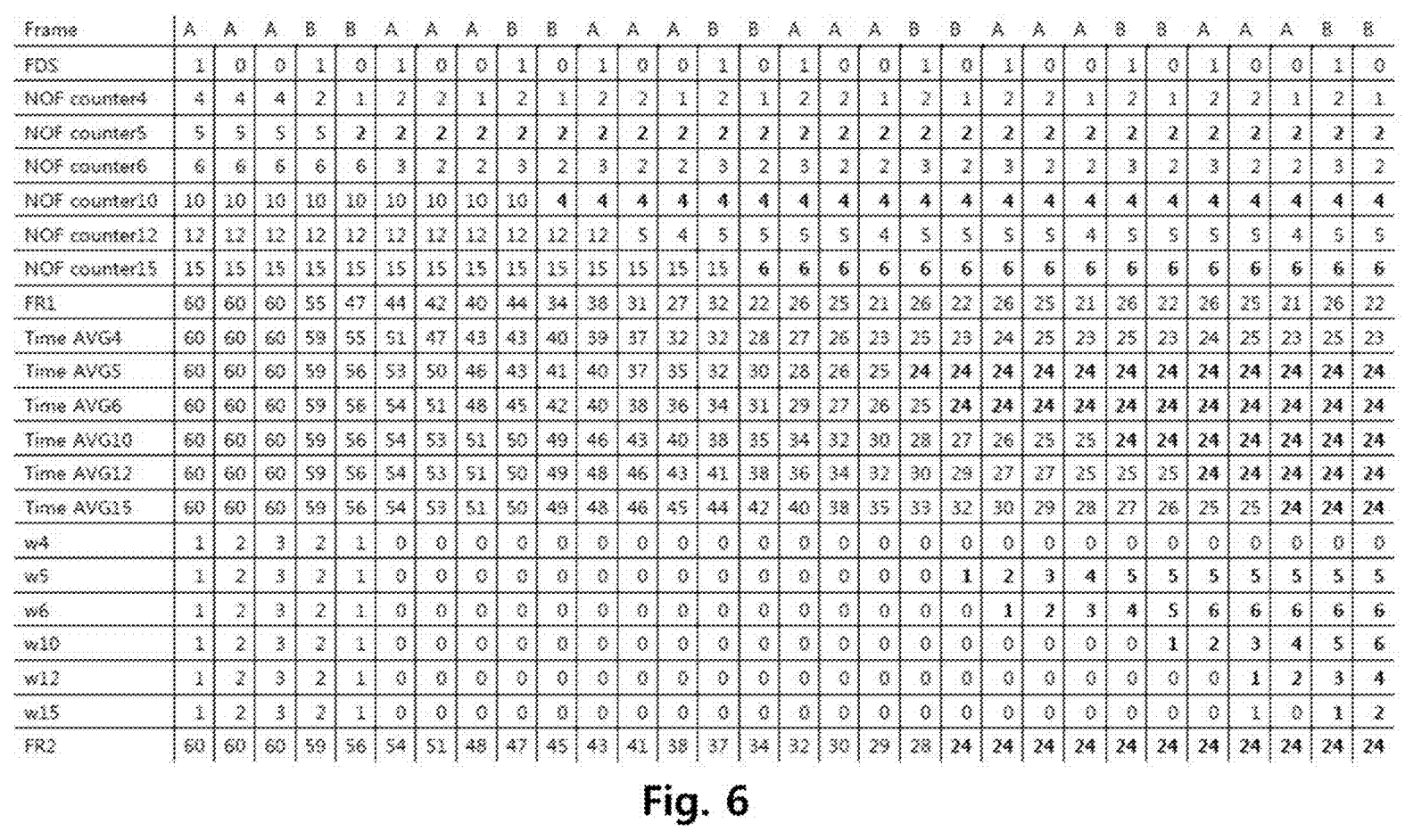

FIG. 6 is a view illustrating an outline of an operation of the present embodiment in a case in which frames with a source frame rate of 24 Hz are provided at an input frame rate of 60 Hz. The illustrated embodiment performs a calculation using a window having lengths of 4, 5, 6, 10, 12, and 15 and an average calculator having the same lengths. Referring to FIG. 6, an FDS is obtained from sequentially provided frames. Since [10010] is repeated in the FDS, a repeating unit is 5 frames, and as illustrated in bold, it can be seen that the NOF obtained from windows having lengths corresponding to multiples of 5 converges.

The NOFs are multiplied by values corresponding to the lengths of the windows and added to calculate an arithmetic average. When a window length is 4, and an input frame rate is 60 Hz, the NOF in a window is multiplied by 15 (=60/4), when a window length is 5, the NOF is multiplied by 20 (=60/5), when a window length is 6, the NOF is multiplied by 10 (=60/6), when a window length is 10, the NOF is multiplied by 6 (=60/10), when a window length is 12, the NOF is multiplied by 5 (=60/12), and when a window length is 5, the NOF is multiplied by 4 (=60/15, see Equation 2). Calculated values are added to calculate a frame rate arithmetic average FR1.

A time average calculation is performed for the frame rate arithmetic average FR1 using different lengths, and calculated values, in which the calculated results are multiplied by weights, $w_i$, $w_j$, $w_k$, $w_l$, $w_m$, and $w_n$, are added to calculate a weighted average.

The weight decreases by 1 when the time average diverges or oscillates, and has a minimum value of 0. In addition, the weight increases by 1 when the time average converges, and has a maximum value which is a length by which the time average is calculated. When a result of the calculation converges, the corresponding calculation result participates in the frame rate calculation at a high weight, and values, which do not converge, are prevented from participating in the frame rate calculation at a high weight.

As illustrated in FIG. 6, it can be seen that a frame rate FR2 calculated through a second stage converges to 24 Hz which is a frame rate of a source as time passes.

Frame Rate Conversion Method

Figure 7:
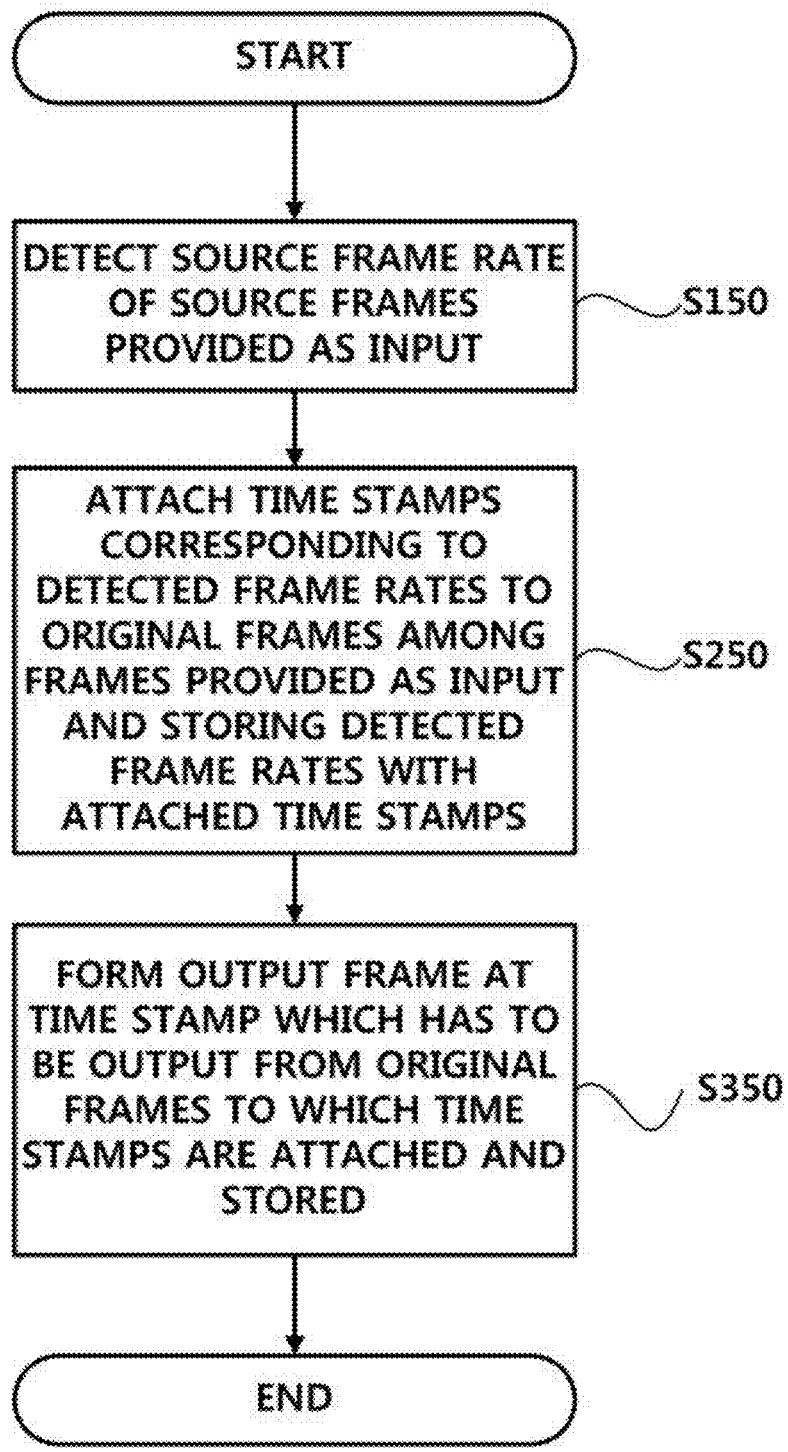
FIG. 7 is a flowchart illustrating an outline of a frame rate conversion method according to the present embodiment.

Hereinafter, a frame rate conversion method according to the present embodiment will be described with reference to the accompanying drawings. FIG. 7 is a flowchart illustrating an outline of a frame rate conversion method according to the present embodiment. Referring to FIG. 7, the frame rate conversion method according to the present embodiment includes detecting source frame rates of source frames provided as an input (S150), attaching time stamps corresponding to the detected frame rates to original frames among the frames provided as the input and storing the detected frame rates with the attached time stamps (S250), forming an output frame at the time stamp which has to be output from the original frames to which the time stamps are attached and stored (S350).

The time stamps denote time scales at which the frames are disposed. In one embodiment, when an interval from 0 seconds to 1 second is expressed with the time stamp, the time stamp may be expressed with L at 0 seconds, and after 1 second, the time stamp may be expressed with L at 0 seconds again (a period of time stamps is L). As an example, when a source frame rate is 60 Hz, any two adjacent frames may be disposed at 0 seconds and 1/60 second, and these may be denoted by the time stamps of 0 and L/60.

In one embodiment, the time stamps may be common multiples of generally used frame rates such as 8 Hz, 12 Hz, 24 Hz, 30 Hz, 50 Hz, 60 Hz, and 120 Hz, and may express intervals between source frames with frame rates, which are currently used or will be used in the near future, as integers.

In another embodiment, frames may have random numbers and may not be divided by a generally used frame rate such as 8 Hz, 12 Hz, 24 Hz, 30 Hz, 50 Hz, 60 Hz, or 120 Hz. In a case in which the frames are not divided by frame rates, time stamps at which the frames are positioned may be obtained by performing round-up calculations.

In one embodiment, a period L of a next time stamp may be 90,000 which is a common multiple of generally used frame rates. In another embodiment, the time stamp corresponding to an interval from 0 to 1 second may be an integer multiple of 0 to 90,000, and the next time stamp starts from 0 again. However, this is for facilitating mathematical calculation and not for limiting the scope of the present invention.

TABLE 2

| a frame rate of a source | time stamp interval |
|---|---|
| 8 Hz | 11250 |
| 12 Hz | 7500 |
| 24 Hz | 3750 |
| 25 Hz | 3600 |
| 30 Hz | 3000 |
| 50 Hz | 1800 |
| 60 Hz | 1500 |
| 120 Hz | 750 |

Table 2 shows time stamp intervals of frames corresponding to illustrated frame rates. As illustrated in Table 2, the frames with predetermined frame rates are separated by time stamp intervals denoted by integers. As an example, frames with a frame rate of 60 Hz are separated by 1/60 second. When the frames with the frame rate of 60 Hz are expressed with the time stamp interval, the frames may be expressed as being separated by the time stamp of 1500. As another example, frames with a frame rate of 24 Hz are separated by an interval of 1/24 second. When the frames with the frame rate of 24 Hz are expressed with a time stamp interval, the frames may be expressed as being separated by the time stamp of 3750. In one embodiment, an input time stamp attached to input frames and an output time stamp attached to output frames which are to be output may be calculated by the following Equation 3.

$$its_k = \left(its_{k-1} + \frac{L}{f_n}\right) \bmod L \quad \text{[Equation 3]}$$

$$ots_l = \left(ots_{l-1} + \frac{L}{f_n}\right) \bmod L$$

($f_n$: a detected frame rate of a source, $f_o$: an output frame rate, L: a time stamp period, its: an input time stamp, ots: an output time stamp)

A frame rate of frames which are sequentially input is detected according to above-described embodiment. To remove repeatedly provided frames, the frames denoted as 1 in an FDS are stored in a buffer with a time stamp corresponding to a detected frame rate of a source (S250).

Figure 8:
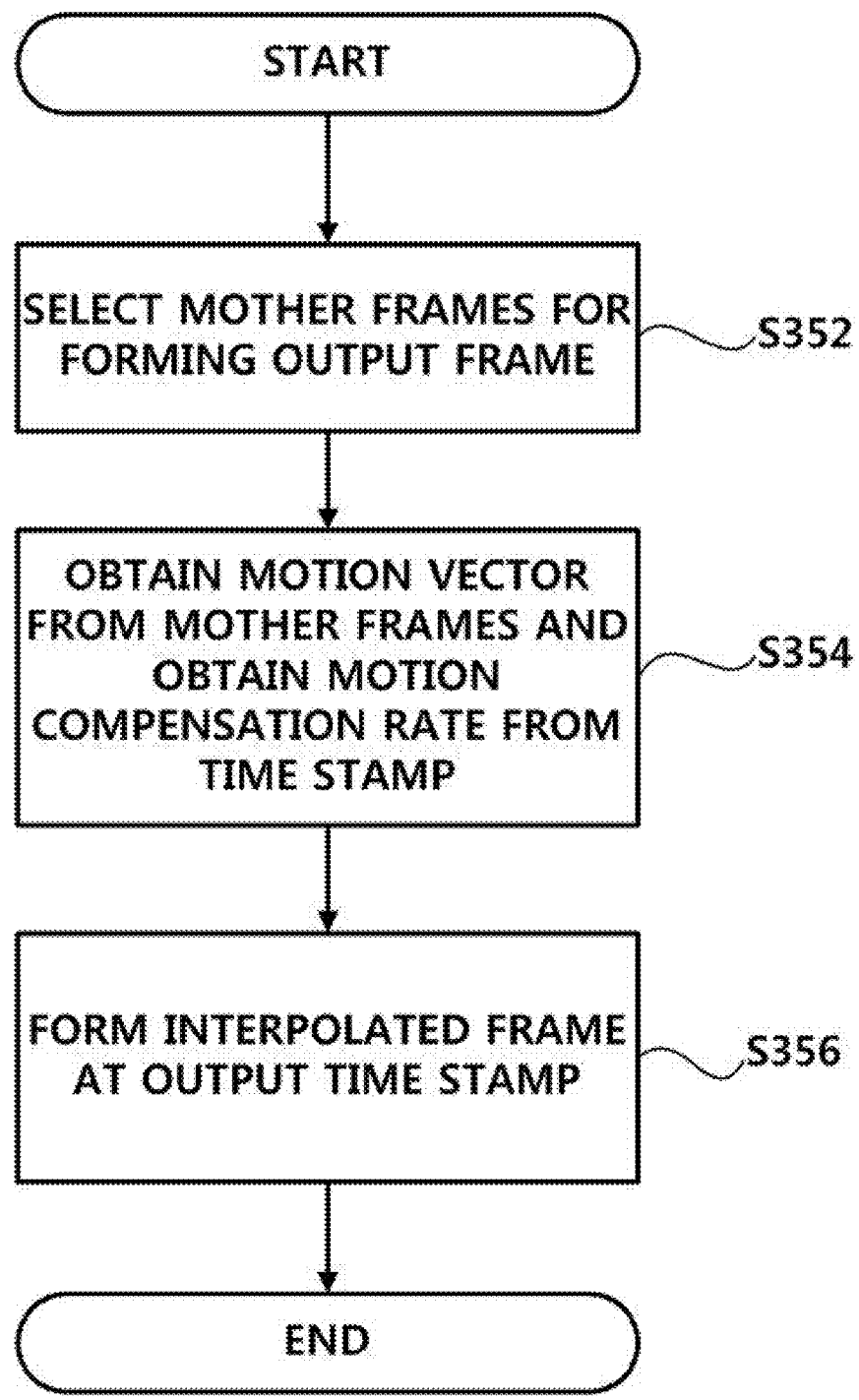
FIG. 8 is a flowchart illustrating an operation in which an output frame is formed from original frames to which input time stamps are added in detail.
Figure 9:
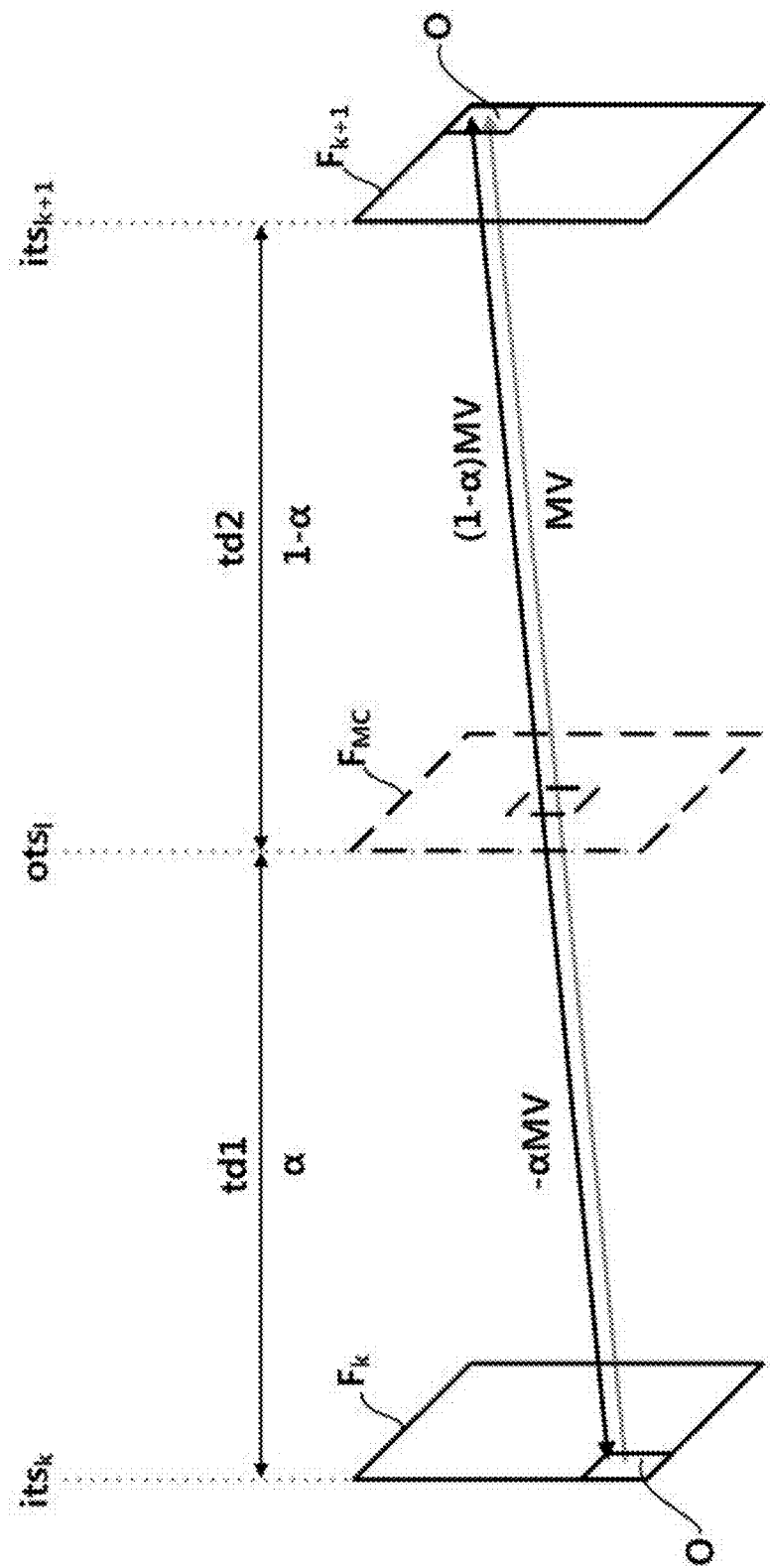
FIG. 9 is a schematic view for describing an operation in which an output frame is formed from mother frames.

FIG. 8 is a more detailed flowchart illustrating an operation (S350) in which an output frame is formed from original frames to which input time stamps are added. FIG. 9 is a schematic view for describing an operation in which an output frame is formed from mother frames $F_k$ and $F_{k+1}$. Referring to FIGS. 8 and 9, the mother frames $F_k$ and $F_{k+1}$ are chosen for forming an interpolated output frame (S352). In one embodiment, two adjacent frames with a time stamp, which is interposed therebetween, of output frames among frames stored in a buffer may be chosen as the mother frames $F_k$ and $F_{k+1}$. As an example, mother frames $F_k$ and $F_{k+1}$ are adjacent frames with an output time stamp, which is interposed therebetween, of frames denoted as 1 in an FDS.

A motion vector (MV) is obtained from the mother frames $F_k$ and $F_{k+1}$, and a motion compensation rate α is obtained using the time stamp (S354). The MV may be obtained by performing motion estimation (ME) on a moving object O in the mother frames $F_k$ and $F_{k+1}$.
The motion compensation ratio may be obtained using the time stamp through the following Equation 4.

$$\alpha = \frac{td1}{td1+td2} = \frac{ots_l - its_k}{its_{k+1} - its_k} \quad \text{[Equation 4]}$$

An interpolated frame ($F_{MC}$) is formed at an output time stamp using an MV and a motion compensation rate obtained by performing ME and motion compensation (S356). In one embodiment, an output time stamp of a mother frame and an output time stamp of an interpolated frame may be the same. As an example, in a case in which a source frame rate is 30 Hz, and an output frame rate is 60 Hz, an output time stamp of a mother frame and an output time stamp of an interpolated frame may be the same, and in this case, the mother frame may be output at the output time stamp. As another example, a motion compensation rate α may be 0, this case is also the same as the case in which an output time stamp of a mother frame and an output time stamp of an output frame are the same, and in this case, the mother frame may also be output at the output time stamp.

Figure 10:
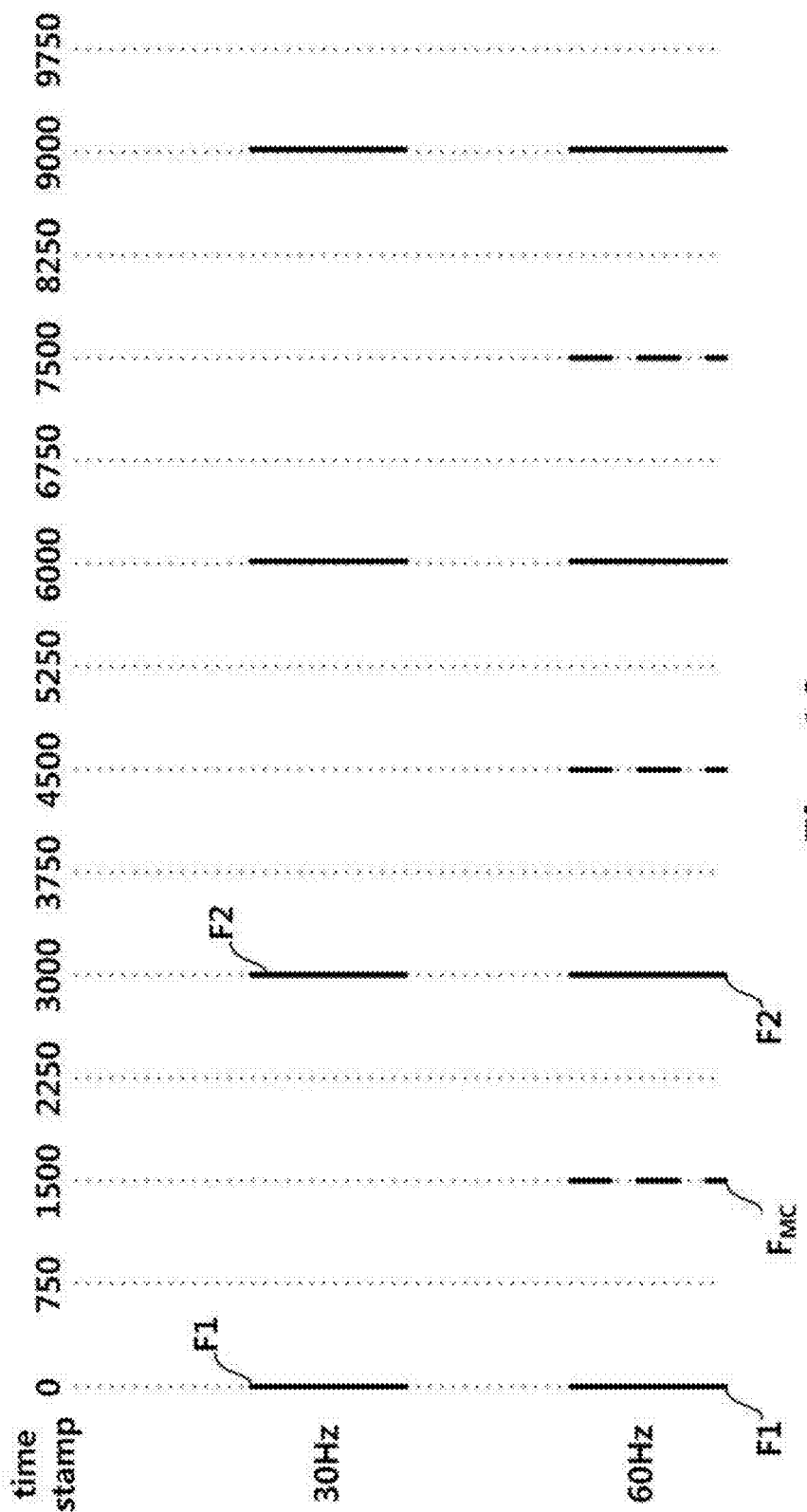
FIG. 10 is a schematic view for describing a frame rate conversion method according to the present embodiment.

Hereinafter, an example of the frame rate conversion method according to the present embodiment will be described with reference to the accompanying drawings. FIG. 10 is a schematic view for describing a frame rate conversion method according to the present embodiment. In an example illustrated in FIG. 10, a source with a frame rate of 30 Hz is up-converted at a frame rate of 60 Hz. Here, the source is stored with an input time stamp, an output is formed at an output time stamp, but hereinafter, a source and an output are disposed at the same time stamp for the sake of simple description and ease of understanding.

Referring to FIG. 10, since adjacent source frames of 30 Hz are separated by a time stamp interval of 3000, and an output has a frame rate of 60 Hz, adjacent output frames have to be separated by a time stamp interval of 1500. In addition, the output frames may be formed with a corresponding output frame rate by forming adjacent mother frames F1 and F2, which are illustrated with solid lines, of a source and one $F_{MC}$ obtained by performing motion compensated frame interpolation on the adjacent input frames at a target time stamp of 1500.

Figure 11:
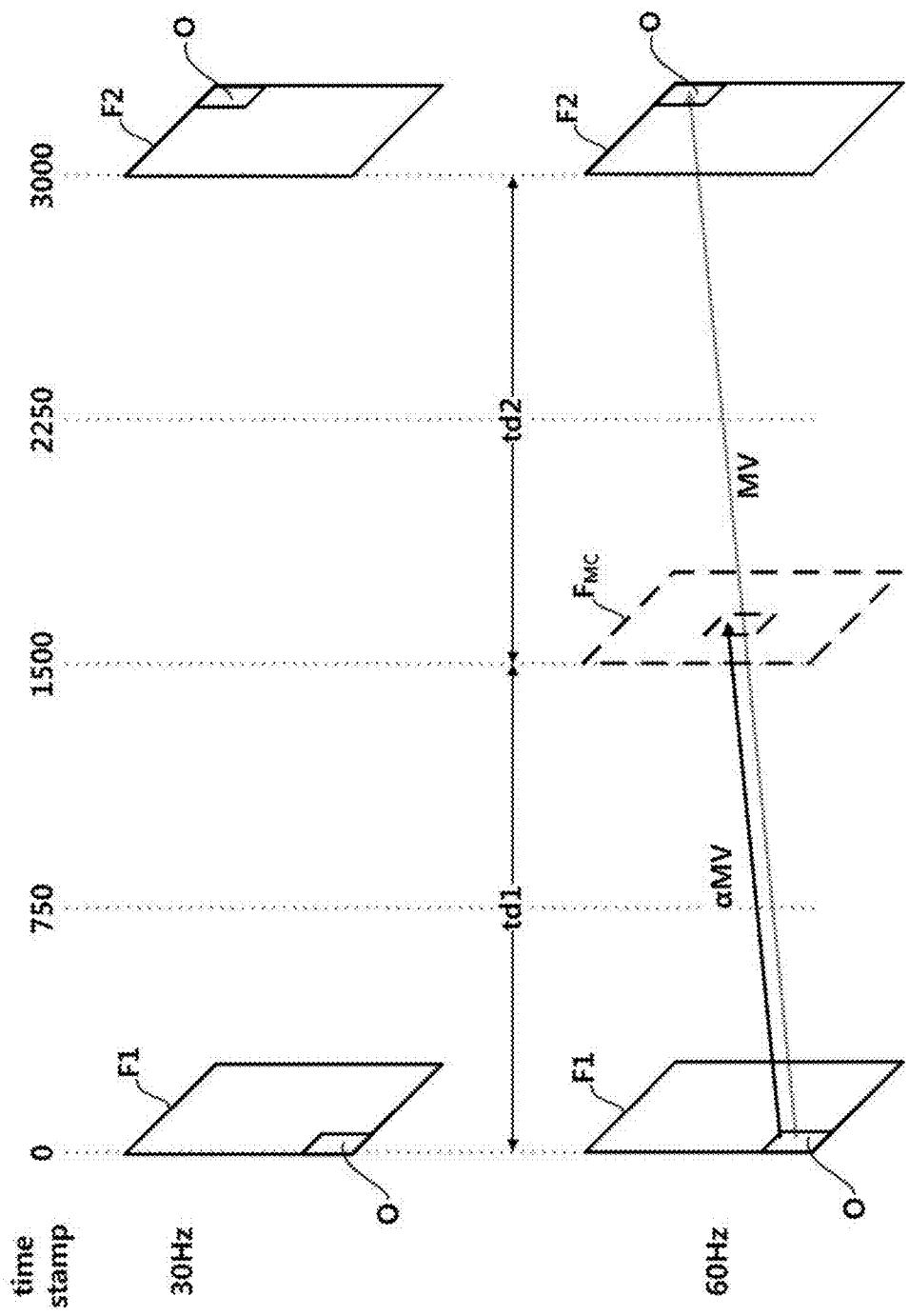
FIG. 11 is a view for describing a process of performing motion compensation to form a new frame.

FIG. 11 is a view for describing a process of performing motion compensation to form a new frame. Referring to FIG. 11, it is assumed that an object O moves in two adjacent mother frames F1 and F2. The mother frames F1 and F2 for forming an output $F_{MC}$ are chosen (S352). As described, adjacent frames with a time stamp of 1500, which is interposed therebetween, and at which an output $F_{MC}$ is formed, among frames stored in a buffer may be chosen as the mother frames F1 and F2.

An MV and a motion compensation rate α are obtained from the mother frames F1 and F2 (S354). Even in a case in which the object O accelerates, the object O may be approximated to move at a constant speed for a short time period corresponding to an interval between frames.

From the approximation, ME is performed on the moving object to obtain the MV, and MC is performed to obtain a motion compensation rate α. The motion compensation rate α may be calculated using a time stamp as follows.

$$\alpha = \frac{td1}{td1+td2} = \frac{ots_l - its_k}{its_{k+1} - its_k} = \frac{1500-0}{3000-0} = 0.5 \quad \text{[Equation 5]}$$

An $F_{MC}$ is formed using a compensated MV αMV by the motion compensation rate α, and the $F_{MC}$ is disposed at a time stamp of 1500 corresponding to an output frame rate to perform frame rate conversion (S356). In addition, since output time stamps of the mother frames F1 and F2 are the same as input time stamps, the mother frames F1 and F2 may be used as output frames.

Figure 12:
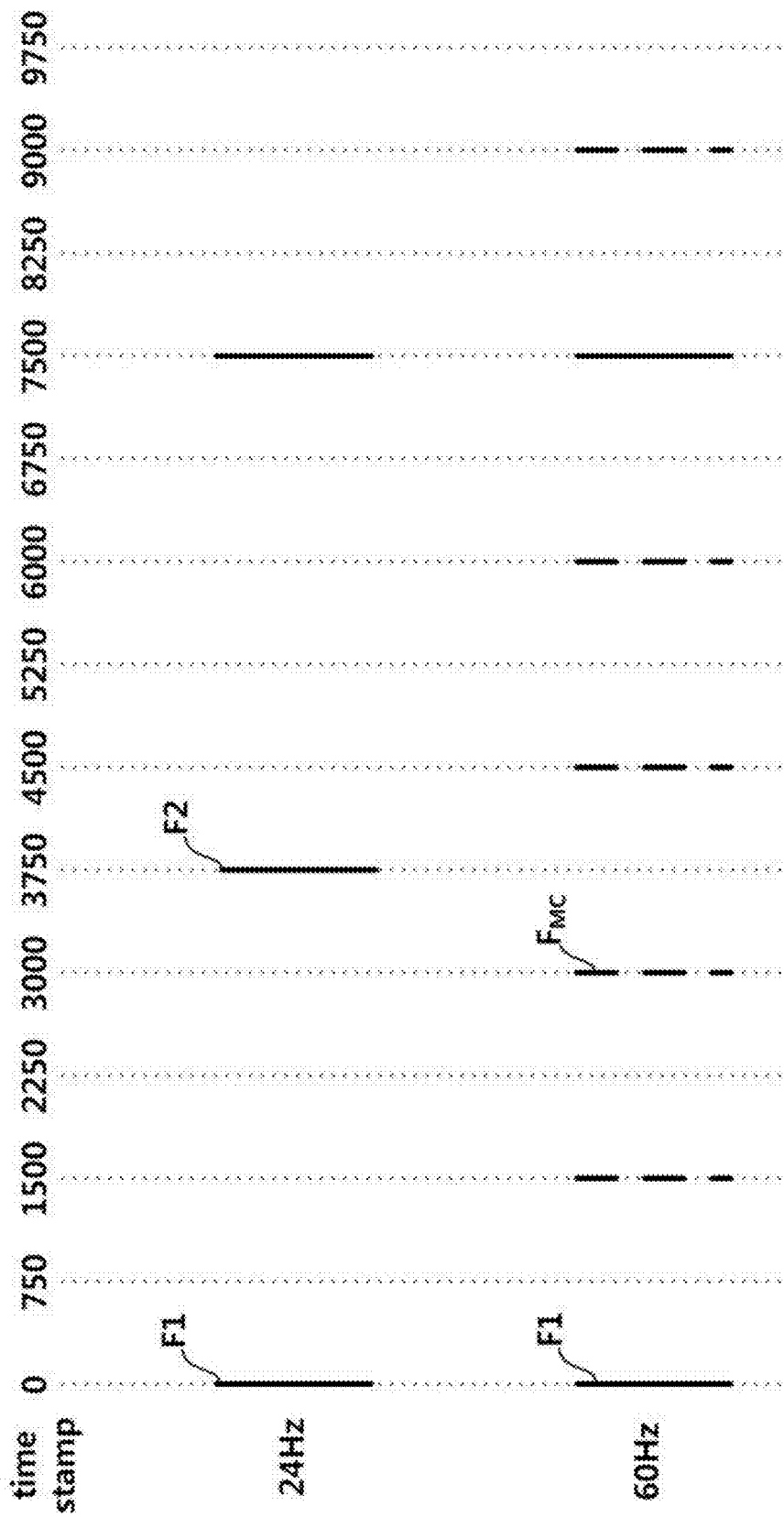
FIGS. 12 and 13 are schematic views for describing another example of the frame rate conversion method according to the present embodiment, wherein a source with a frame rate of 24 Hz is up-converted at a frame rate of 60 Hz.
Figure 13:
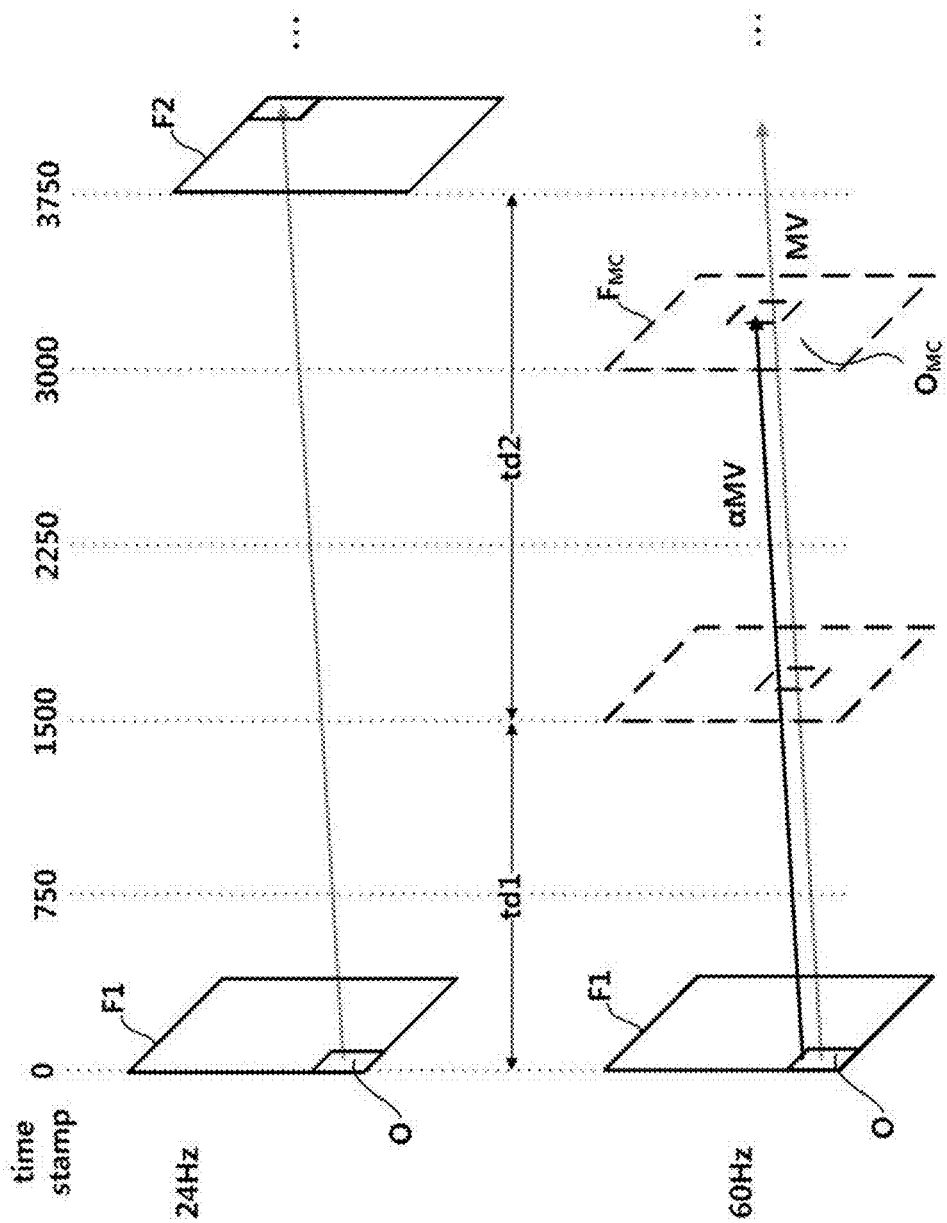

FIGS. 12 and 13 are schematic views for describing another example of the frame rate conversion method according to the present embodiment, wherein a source with a frame rate of 24 Hz is up-converted at a frame rate of 60 Hz. FIGS. 12 and 13 are schematic views for describing an interpolated frame formed at a time stamp of 3000 using mother frames F1 and F2. Referring to FIGS. 12 and 13, adjacent frames with the time stamp of 3000, which is interposed therebetween and corresponds to an output frame rate, are chosen as the mother frames F1 and F2 (S352). As described, the adjacent frames with the time stamp of 3000, which is interposed therebetween and at which an output $F_{MC}$ is formed, among frames stored in a buffer may be chosen as the mother frames F1 and F2.

In one embodiment, new frames are formed from the adjacent mother frames F1 and F2 by performing MC, but any one of the mother frames may not be included in an output and may be removed. Since an input time stamp and an output time stamp of the mother frame F1 are the same (or, a motion compensation rate is 0), the mother frame F1 is output as an output frame.

ME is performed on a moving object O in the two adjacent source frames F1 and F2 to obtain an MV, and MC is performed to obtain a motion compensation rate α (S352). Accordingly, the motion compensation rate α for the object O may be calculated using time stamps td1 and td2 through Equation 3. As an example, a motion compensation rate α is calculated at an $F_{MC2}$, which will be newly formed, using the following Equation 6.

$$\alpha = \frac{td1}{td1+td2} = \frac{ots_l - its_k}{its_{k+1} - its_k} = \frac{3000-0}{3750-0} = 0.8 \quad \text{[Equation 6]}$$

An $F_{MC}$ may be formed using a compensated MV αMV by the motion compensation rate α obtained using the time stamps, and the $F_{MC}$ may be disposed at the time stamp of 3000 corresponding to an output frame rate to perform frame rate conversion (S356).

Experiment Results

FIGS. 14A to 14L are graphs showing results of experiments in which frame rates of sources are detected through the frame detection method according to the present embodiment, and the frame rates are converted to target frame rates through the frame rate conversion method according to the present embodiment.

Figure 14A:
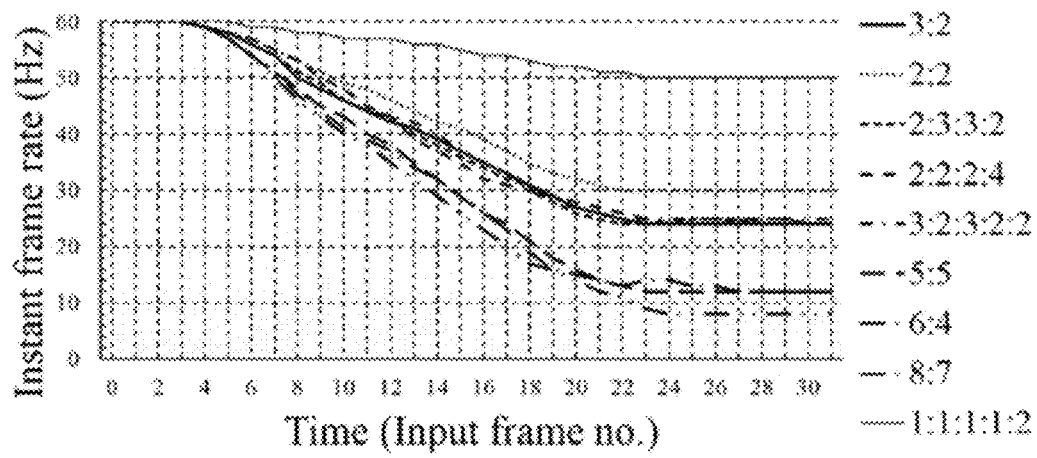
FIGS. 14A to 14L are graphs showing results of experiments in which a frame rate of a source is detected through the frame detection method according to the present embodiment and the frame rate is converted to a target frame rate through the frame rate conversion method according to the present embodiment.
Figure 14B:
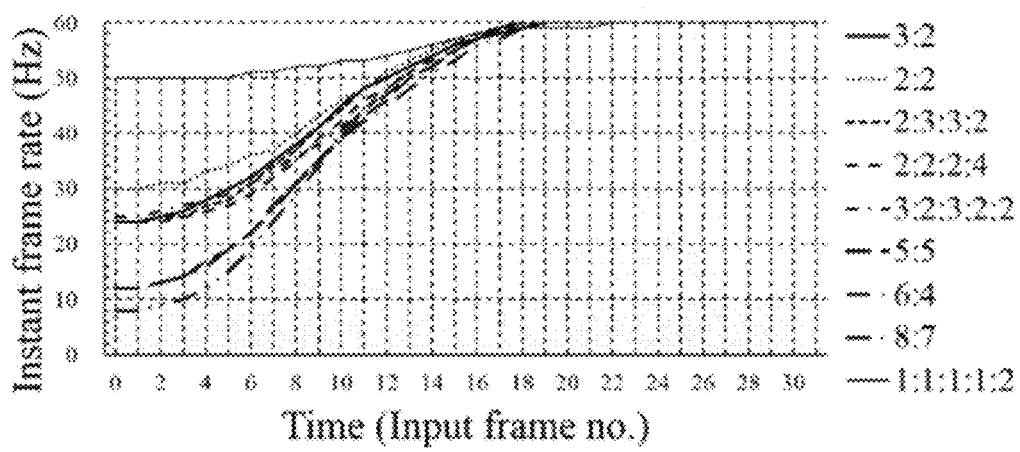
Figure 14C:
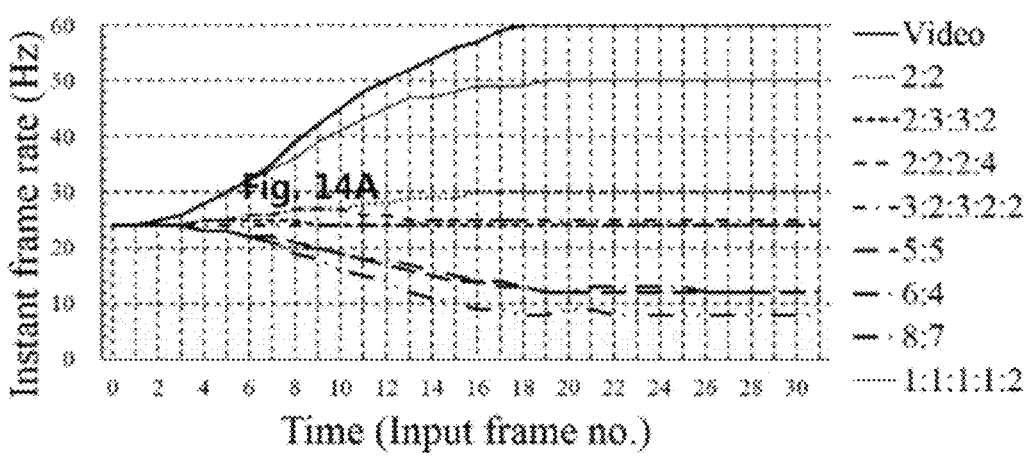
Figure 14D:
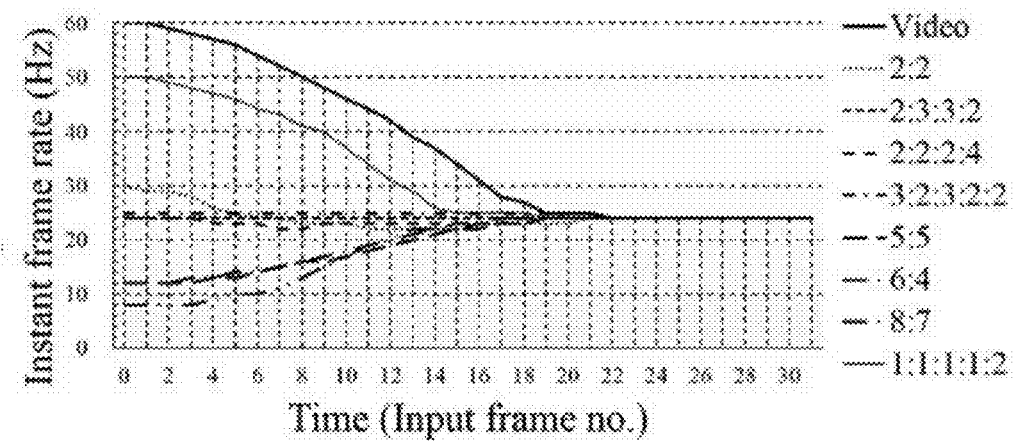
Figure 14E:
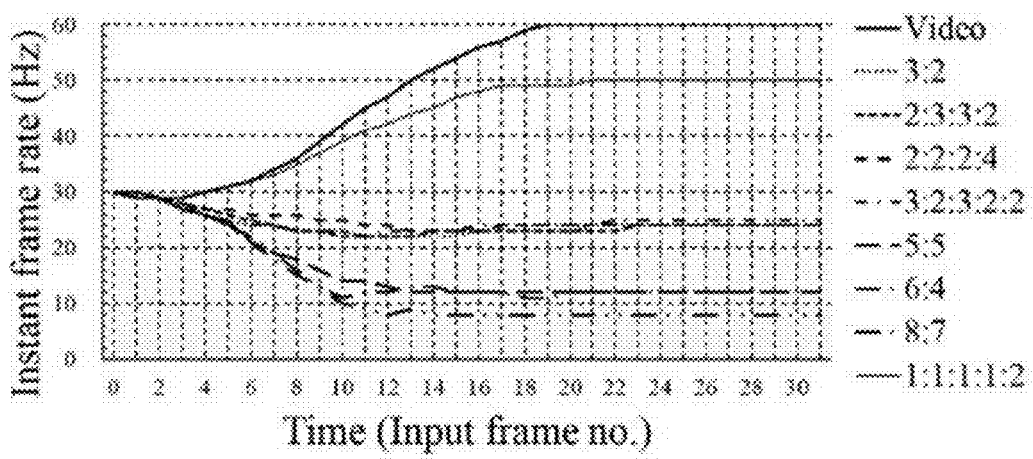
Figure 14F:
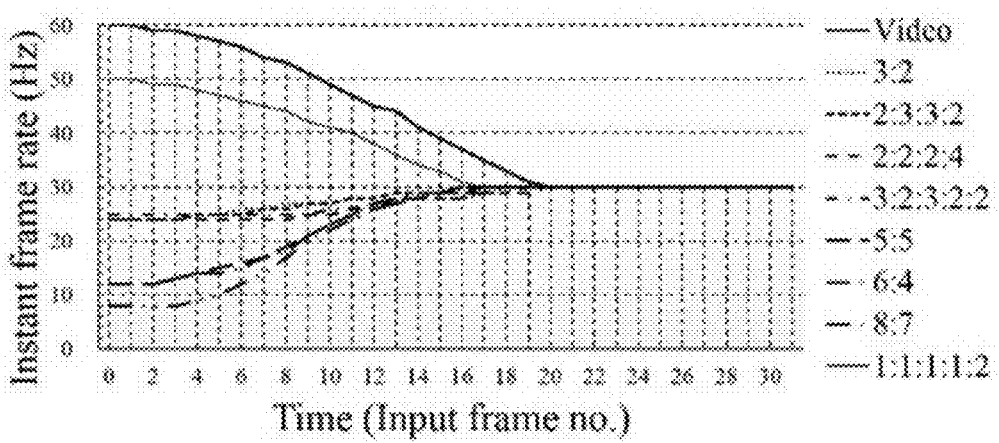
Figure 14G:
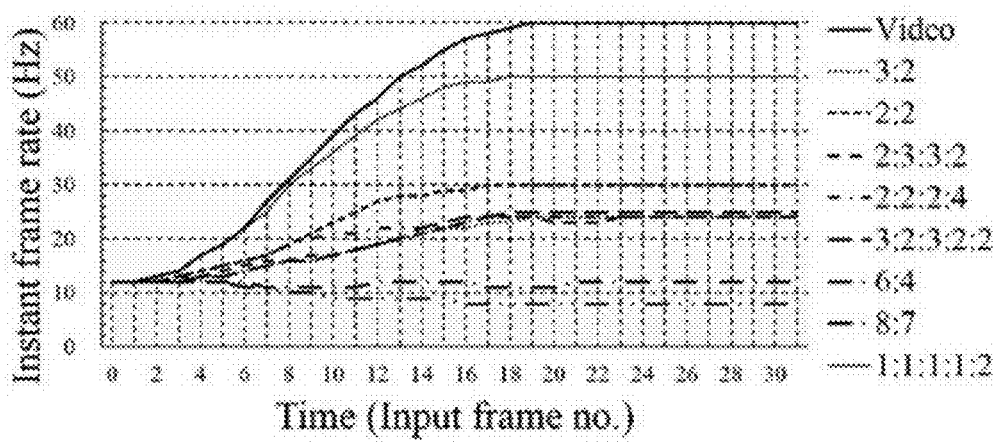
Figure 14H:
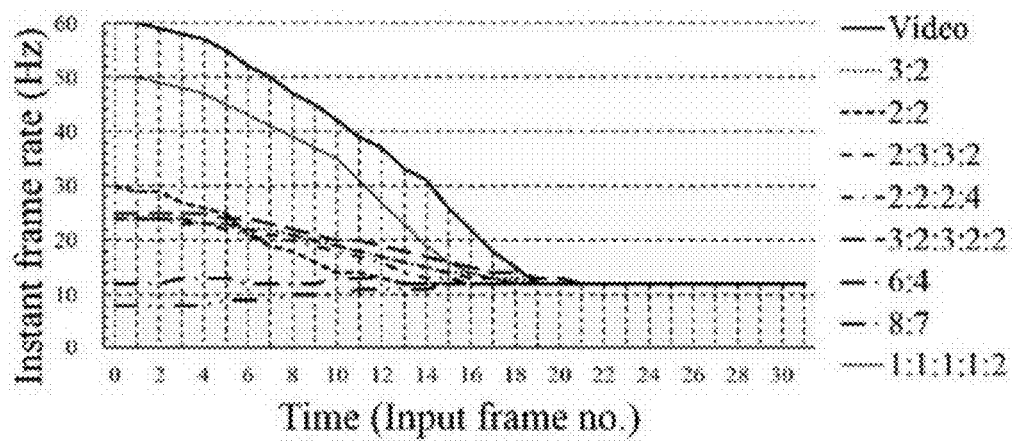
Figure 14I:
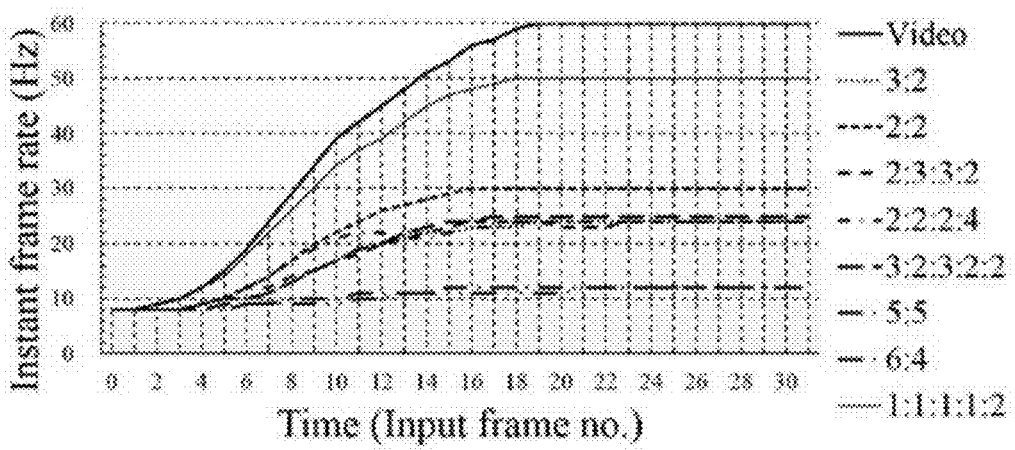
Figure 14J:
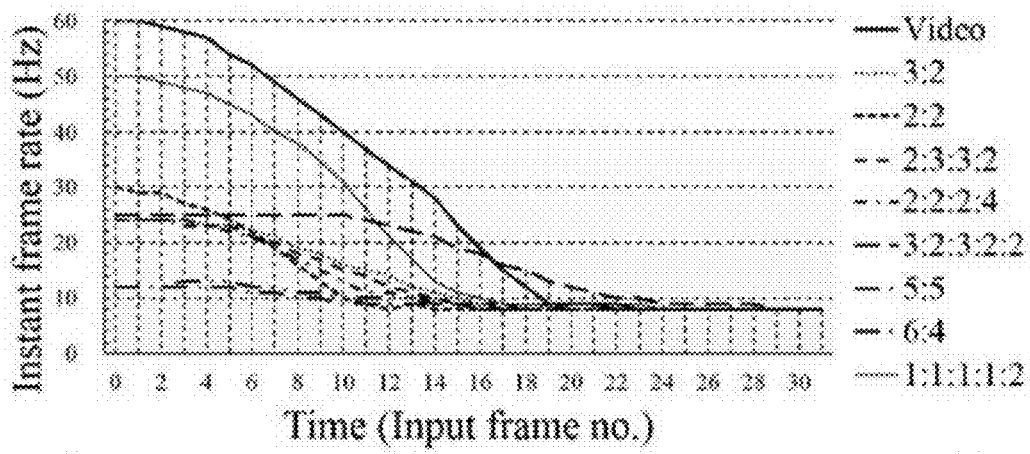
Figure 14K:
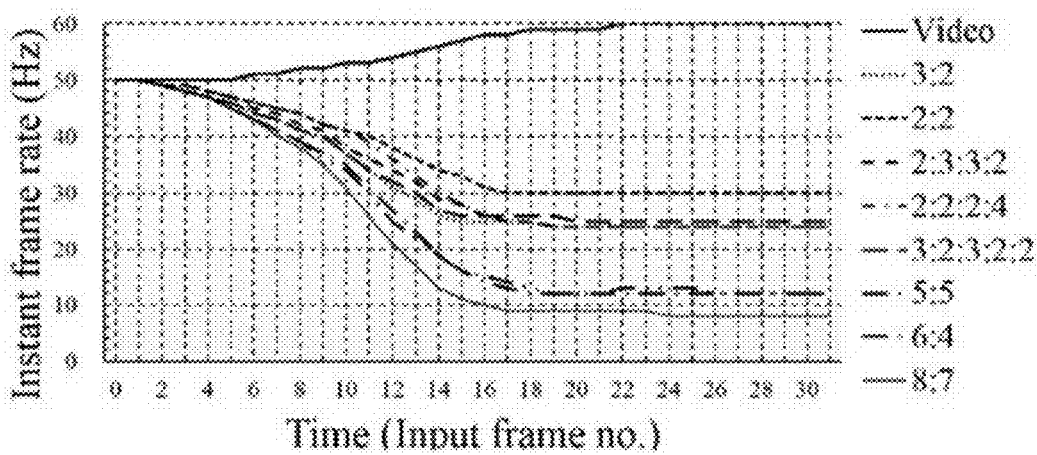
Figure 14L:
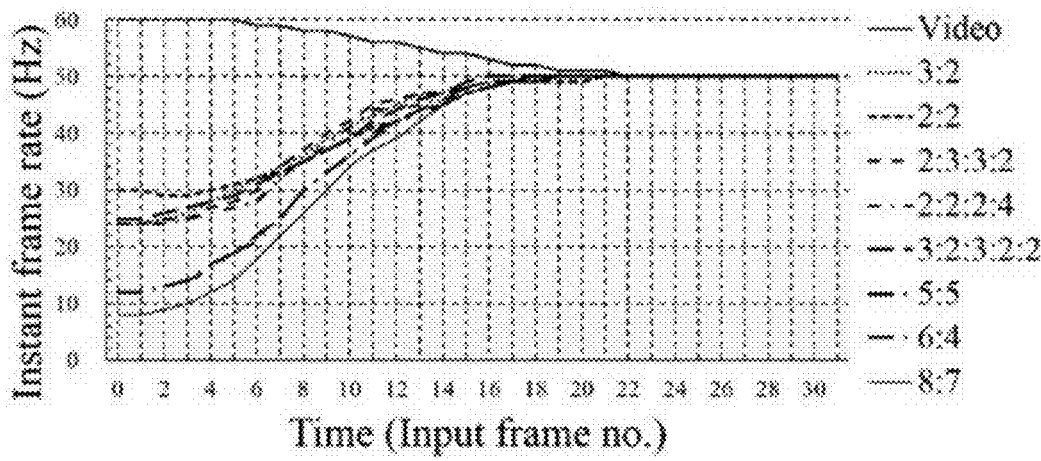

FIG. 14A is a view illustrating a case in which a source with a frame rate of 60 Hz is converted at a frame rate of 8 Hz, 12 Hz, 24 Hz, 25 Hz, 30 Hz, or 50 Hz, and FIG. 14B is a view illustrating a case in which a source with a frame rate of 8 Hz, 12 Hz, 24 Hz, 25 Hz, 30 Hz, or 50 Hz is converted at a frame rate of 60 Hz. FIG. 14C is a view illustrating a case in which a source with a frame rate of 24 Hz is converted at a frame rate of 8 Hz, 12 Hz, 25 Hz, 30 Hz, 50 Hz, or 60 Hz, and FIG. 14D is a view illustrating a case opposite the case of FIG. 14C. FIG. 14E is a view illustrating a case in which a source with a frame rate of 30 Hz is converted at a frame rate of 8 Hz, 12 Hz, 25 Hz, 24 Hz, 50 Hz, or 60 Hz, FIG. 14F is a view illustrating a case opposite the case of FIG. 14E. FIG. 14G is a view illustrating a case in which a source with a frame rate of 12 Hz is converted at a frame rate of 8 Hz, 30 Hz, 25 Hz, 24 Hz, 50 Hz, or 60 Hz, and FIG. 14H is a view illustrating a case opposite the case of FIG. 14G. FIG. 14I is a view illustrating a case in which a source with a frame rate of 8 Hz is converted at a frame rate of 12 Hz, 30 Hz, 25 Hz, 24 Hz, 50 Hz, or 60 Hz, and FIG. 14J is a view illustrating a case opposite the case of FIG. 14I. FIG. 14K is a view illustrating a case in which a source with a frame rate of 50 Hz is converted at a frame rate of 12 Hz, 30 Hz, 25 Hz, 24 Hz, 8 Hz, or 60 Hz, and FIG. 14L is a view illustrating a case opposite the case of FIG. 14K.

Referring to FIG. 14, it can be seen that in a process in which a source with any one frame rate is converted at another frame rate, the frame rate conversion is rapidly completed because the conversion is completed within about 12 frames to 22 frames. In addition, even in a case in which a frame rate is abruptly changed, glitches do not occur so that the frame rate conversion is smoothly completed. From such a result, there are advantages in that more natural and smooth ME and MC can be provided.

Figure 15:
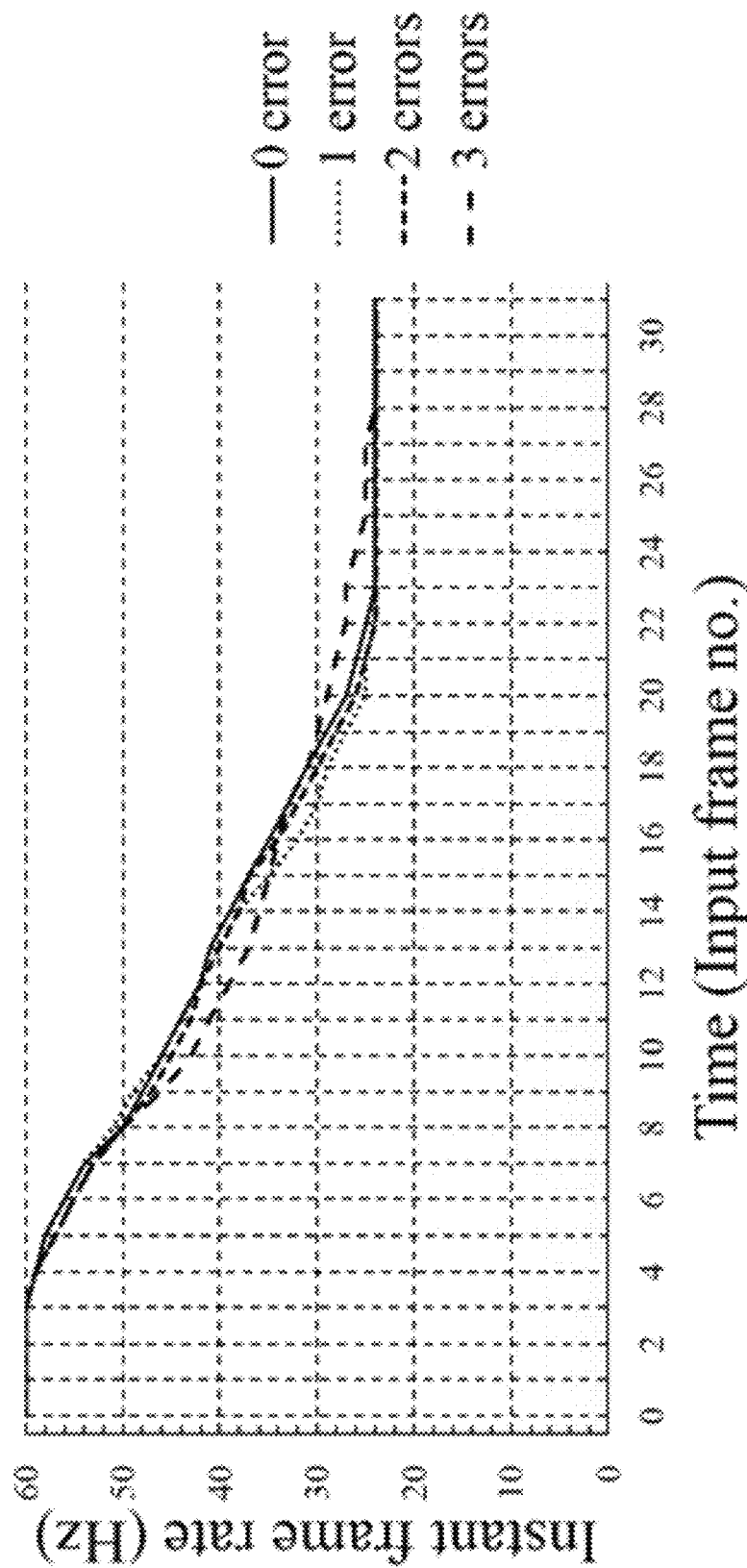
FIG. 15 is a graph showing a result of a case in which errors due to noise and the like intervene into a process in which a source with a frame rate of 60 Hz is converted at a frame rate of 24 Hz.

FIG. 15 is a graph showing a result of a case in which errors due to noise and the like intervene into a process in which a source with a frame rate of 60 Hz is converted at a frame rate of 24 Hz. Referring to FIG. 15, even in a case in which a plurality of errors intervene into the process, it can be seen that frame rate conversion is relatively rapidly completed when compared to a case in which there are no errors (0 errors). Accordingly, it can be seen that the present embodiment has a property of robustness against noise.

As described above, there are advantages in that a frame rate detection method according to the present embodiment is robust against noise and incorrect editing, and can detect a correct frame rate. In addition, there are advantages in that resources consumed to perform the frame rate conversion method can be reduced and a smooth conversion in frame rate can be performed even when abrupt frame rate conversion is performed because the frame rate conversion method according to the present embodiment based on a time stamp is not a scenario-based method.

While the invention has been described with reference to the embodiments illustrated in the accompanying drawings for promoting an understanding of the present invention, the embodiments should be considered in a descriptive sense only, and it should be understood that various alterations and equivalent other embodiments may be made by those skilled in the art. Therefore, the scope of the invention is defined by the appended claims.

What is claimed is:

1. A method of detecting a frame rate of a source, comprising the steps of:
    (a) receiving frames of a source provided at an input frame rate (T);
    (b) providing the frames to a window having a predetermined length (k) to detect the number of original frames (n) included within the window having the length (k); and
    (c) multiplying the input frame rate divided by the length (T/k) and the number of original frames (n).

2. The method of claim 1, further comprising calculating an arithmetic average of results of the step (c).

3. The method of claim 1, wherein the step (b) is simultaneously performed with a plurality of windows having different lengths.

4. The method of claim 3, further comprising (d) calculating an arithmetic average of results of the simultaneous performance.

5. The method of claim 4, further comprising:
    (e) providing a result of the step (d) to a plurality of time average calculators having different lengths to calculate time averages corresponding to the lengths; and
    (f) calculating a weighted average of results calculated in the step (e).

6. The method of claim 5, wherein, in the step (f), a weight of the weighted average increases as the average calculated in the step (e) converges.

7. The method of claim 5, wherein, in the step (f), a weight of the weighted average decreases as the average calculated in the step (e) does not converge.

* * * * *